United States Patent [19]
Bright, Sr.

[11] 4,134,550
[45] Jan. 16, 1979

[54] LIQUID FLOW CONTROL DEVICE

[76] Inventor: Elvin M. Bright, Sr., 17242 Bircher St., Granada Hills, Calif. 91344

[21] Appl. No.: 801,458

[22] Filed: May 31, 1977

[51] Int. Cl.² .............................................. B05B 1/30
[52] U.S. Cl. .................................... 239/542; 239/550
[58] Field of Search ............... 239/145, 271, 542, 547, 239/550; 61/12, 13; 138/40, 46; 251/145

[56] References Cited

U.S. PATENT DOCUMENTS

| | | | |
|---|---|---|---|
| 2,628,865 | 2/1953 | Duncan | 239/547 X |
| 2,697,582 | 12/1954 | Grosch | 61/12 X |
| 3,794,294 | 2/1974 | Sherman | 61/12 X |
| 3,797,755 | 3/1974 | Saisho | 239/547 |
| 3,837,619 | 9/1974 | Sherman | 61/12 X |
| 3,891,150 | 6/1975 | Hoff et al. | 239/547 X |

*Primary Examiner*—Johnny D. Cherry
*Attorney, Agent, or Firm*—Fraser and Bogucki

[57] ABSTRACT

A low cost valve, such as an emitter for controlling the flow from an aperture in a drip irrigation pipe, operates dynamically to maintain flow substantially constant across a wide range of pressures. A cylindrical valve seat mounted within the pipe aperture receives a valve member having a coaxial stem portion that extends through the valve seat to couple an external cap member. The interior end of the valve member comprises a diverging cone defined by integral and circumferentially separated leaf elements that engage a bearing surface of the valve seat at a root circumference when unstressed. Increasing water pressure within the pipe acts against the interior of the cone surface, distorting the leaf elements inwardly a proportional amount and shifting the valve member relative to the bearing surface through a selected limited operating range. The effective apertures between the leaf elements increase in length but decrease in width with greater pressure, providing an increasing impedance that maintains flow rate constant. The leaf elements are of selected stiffness and of relatively low friction material, and assume a stable pressure responsive position whether pressure is increasing or decreasing. The apertures between the leaf members are further shaped to provide an automatic purging flow when the pressure increases to or above a selected maximum.

18 Claims, 9 Drawing Figures

U.S. Patent   Jan. 16, 1979   4,134,550
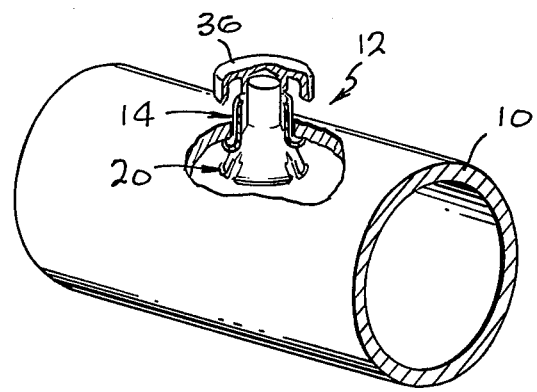
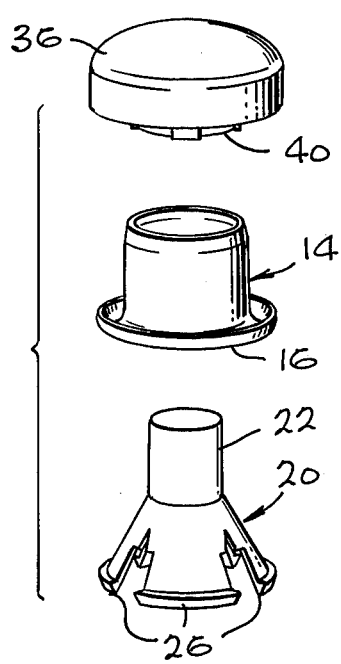
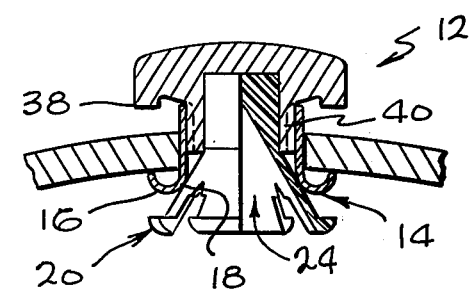
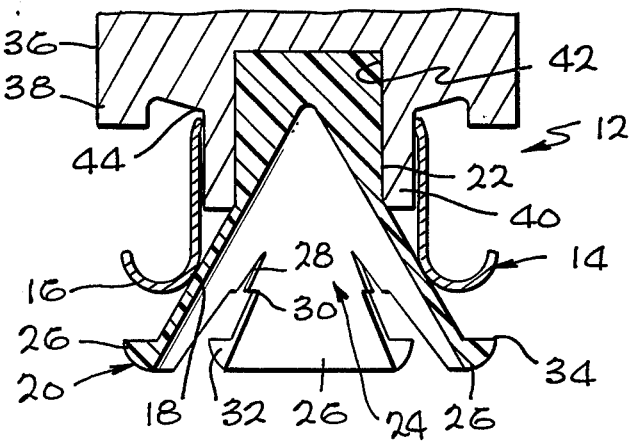

U.S. Patent  Jan. 16, 1979  Sheet 2 of 2  4,134,550
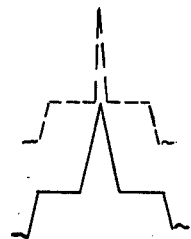
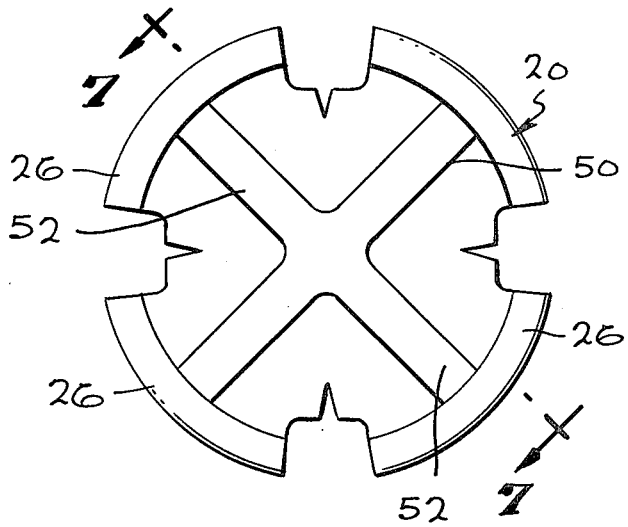
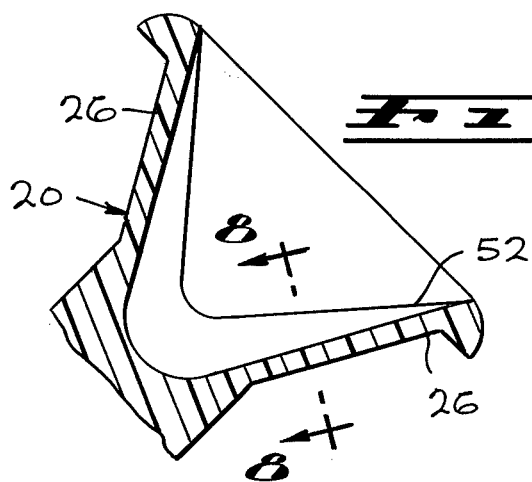
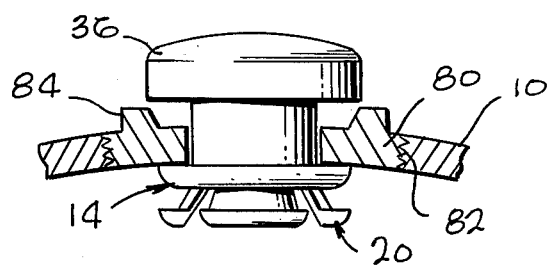

LIQUID FLOW CONTROL DEVICE

BACKGROUND OF THE INVENTION

Substantial increases in the efficiency of water usage for agricultural purposes have resulted from the introduction of drip (also known as trickle) irrigation systems, which first became feasible for large scale use with the availability of low cost plastic pipe. The crucial element in operation of these systems is the emitter, which must provide a selected low rate of flow (from one quart per hour or less to several gallons per hour or more) in response to a substantial (e.g. 5–50 psi) water pressure. In practice, the pipes for drip irrigation systems are generally laid down in matrix or grid patterns, with individual emitters being spaced apart so as to cover given operating diameters, typically from 2 feet to 6 feet. The installations may be above ground or under ground, but in either event hundreds to thousands of emitters are needed per acre. Properly operating systems are found to require only a fraction of the water typically needed with surface spray and irrigation techniques. The constant flow rate keeps the root area of plants moist but not oversaturated, and minimize evaporative and downward flow losses. At the same time chemical nutrients can be added to the soil and the soil itself can be used for beneficial filtering properties.

A number of emitter devices are currently known and in use on a commercial basis with drip irrigation systems. All of the more widely used devices are of the static type, in that they comprise passive flow constrictors which have a sufficiently high fluid impedance in the form of a small aperture to provide an adequate limitation of flow. All such devices are subject to clogging, because particle matter in the lines can block the small passageways. Most of the devices also have substantial operative disadvantages in terms of maintenance and replacement, whatever their design. One such device is built integrally with the pipe and must be cut out in order to be replaced if it becomes clogged. Another device overcomes this problem by being constructed of a number of replaceable parts, but is bulky and still requires manual handling in order to be cleaned.

The most significant limitations on present emitter devices, however, relate to their operating characteristics and cost. Most present emitters cost at least fifty cents each at the minimum, so that the total costs involved when utilizing typical emitter densities become very high. Such costs are not prohibitive for some installations, but do sharply restrict the economic usefulness of the drip irrigation technique. Moreover, in the present state of the art emitter devices operate only within a limited pressure range, as from 17 to 22 psi. The usage of a pressure regulator is of little practical benefit, because the long lines required for large area agricultural fields introduce substantial pressure variations along their length, either from variations in elevation, or from pressure losses along their lengths, or both. A difference of 100 feet in elevation is equivalent to a diminution in pressure from 50 down to 5 psi, an operating range which cannot be accommodated by existing emitter devices.

SUMMARY OF THE INVENTION

Liquid flow control devices in accordance with the invention are dynamic pressure compensating devices having multiple flow apertures defined within a deformable segmented cone valve member disposed within a valve seat member. The cone valve member assumes an axial position relative to the valve seat that is dependent upon pressure deforming the flow apertures so as to compensate for pressure variations. With increased pressure the effective apertures become smaller, thus maintaining flow rate constant.

Emitter devices for drip irrigation systems are arranged to provide substantial linear compensation across a selected pressure range. At pressure levels in excess of the linear compensating range, the valve shifts into a more fully inserted position relative to the valve seat. In this position the effective apertures are substantially enlarged and a flushing action takes place for clearing impurities from the valve or for flooding the irrigated area in controlled fashion.

In a specific example of an emitter valve in accordance with the invention, the unit comprises a three element dynamic device in which a cone valve is seated within a flanged eyelet forming the valve seat, which in turn is mounted within the conduit wall for the drip irrigation system. The cone valve has an integral valve stem extending outside the conduit wall, to the free end of which is coupled a cap member. The cone is defined by a number of circumferentially separated segments of like configuration, the spaces between which define a root slot portion of one diverging angle, an offset shoulder portion and a tip slot portion of a different diverging angle and greater separation. The exterior of the cone rests against the bearing surface of the valve seat at a position dependent upon the interior pressure acting against the concave surface of the cone. The modulus of elasticity and physical dimensions of the cone valve are selected such that there is a very small linear travel of the cone valve relative to the bearing surface in response to a selected wide range of pressure variations. The angle of divergence of the root slot portion is varied such that the flow rate remains constant, as the apertures are closed down due to greater outward movement of the deformable cone under greater pressure. The cone segments also include outwardly curving terminal flanges which engage the flange of the valve seat at a limit position when the pressure is raised to a selected flushing level. In the flushing mode, the tip slot portions provide substantially larger flow apertures for automatic self cleaning of the emitter.

Emitters in accordance with the invention are easily installed in drip irrigation systems, and are extraordinarily low in cost. Only the cone valve element need be changed to accommodate a different pressure range, by using a cone valve having different slot angles. The emitters provide automatic compensation for pressure variations in long lines, avoiding difficulties of the prior art systems. The external cap is arranged to provide a seal against backflow into the pipe interior when the pressure is terminated or lowered. If valve sticking occurs, the valve may be freed simply by pushing the cap inwardly toward the pipe.

Different aspects of the invention enhance the reliability and versatility of the emitter device. To minimize problems with material hysteresis or fatigue, the cone valve may be internally ribbed. The emitter may also be disposed in an insert sleeve which may be threadedly or adhesively secured into a mating pipe aperture.

BRIEF DESCRIPTION OF THE DRAWINGS

A better understanding of the invention may be had by reference to the following description, taken in conjunction with the accompanying drawings, in which:

FIG. 1 is a perspective view, partially broken away, of an installed emitter device, in accordance with the invention, for a drip irrigation system;

FIG. 2 is an exploded view of the elements of the emitter device of FIG. 1;

FIG. 3 is a side sectional view of the arrangement of FIG. 1;

FIG. 4 is an enlarged side sectional fragmentary view of the arrangement of FIG. 1, showing details of the relationship of the valve and valve seat therein;

FIG. 5 is a simplified graphical representation of the valve aperture, showing the manner in which the valve apertures change in shape as the valve member changes position relative to the valve seat;

FIG. 6 is a top view of a cone valve incorporating an interior ribbed structure;

FIG. 7 is a side sectional view of the valve of FIG. 6, taken along the lines 7—7 and looking in the direction of the appended arrows;

FIG. 8 is a fragmentary view of the valve of FIG. 6, taken along the lines 8—8 in FIG. 7 and looking in the direction of the appended arrows; and FIG. 9 is a side sectional view of a removable mounting for an emitter device.

DETAILED DESCRIPTION

A preferred exemplification of a pressure compensating valve in accordance with the invention comprises an emitter for drip irrigation systems, an example of which is depicted in FIGS. 1-4. As in a conventional drip irrigation system used for agricultural purposes, relatively long lengths of low cost plastic (e.g. polyethylene) tubing are disposed in a grid or matrix pattern across an area to be irrigated, with individual emitters being spaced at selected distances dependent upon ambient moisture conditions, soil characteristics, the crop being grown and other factors. Such pipe 10 may be laid above ground or under ground, and is sufficiently pliable to conform to any changes in elevation that are likely to occur in agricultural areas. Polyethylene pipe is also specifically sufficiently distortable to permit on site installation of the emitter devices, with a memory characteristic that retains the devices in place thereafter.

An emitter valve 12 in accordance with the invention may be mounted directly in a radial aperture in the side of the pipe 10, at each point of emission for the conditions selected. The emitter 12 comprises, in this example, a three-part member including a cylindrical valve seat 14 fitting within the pipe 10 aperture, and comprising a female eyelet or sleeve retained in substantially fixed relation to the pipe 10. The valve seat member 14 may be of any of a wide range of materials, including plastic, but preferably is of a metal, such as stainless steel, that may be readily formed and retains its surface characteristics under virtually constant water immersion. Chrome plated brass has also been found satisfactory, and although brass alone may be used it has been found to tend to oxidize within a relatively short period of time under most water conditions. The valve seat member 14 has an outwardly curved flange 16 at the inner end relative to the pipe 10, the outer edge of the flange defining a shoulder resting against the inside of the pipe 10 wall. The interior curved surface of the flange 16 defines a circumferential bearing surface 18 for the valve member in the structure.

The valve member 20 is a male element fitting within the female valve seat 14 and registering with the circumferential bearing surface 18. Preferably, for low cost and high rate production, the valve member 20 is molded as an integral element of synthetic polymer, such as Delrin (trademark of the DuPont Company), nylon, or polypropylene. Such synthetic polymer materials are of relatively low cost and have suitable relatively low frictional coefficients, and relatively high Young's modulus of elasticity (of the order of 400,000 to 500,000 psi), and deform controllably and with suitable recovery under the temperature, force, environment and other operative conditions encountered with drip irrigation systems. However, flow control devices in accordance with the invention, including emitter devices, can utilize a wide variety of other materials that have the desired resiliently deformable characteristics, including polycarbonates, polysulfones, and thermosetting materials such as diallyl phthalate. Where greater modulus values are required, different conditions are involved, or design requirements dictate, higher stiffness materials such as fiber reinforced composites and metal valve members may alternatively be utilized alternatively.

The valve member 20 includes a stem portion 22 coaxial within the valve seat member 14, and having a free end extending radially out from the pipe 10. A radial space between the outer surface of the stem portion 22 and the inner surface of the valve seat 14 defines a liquid passageway for the emitter. A cone portion 24 of the valve member 20 is integral with the stem portion 22 and includes a base and a number (here four) of circumferentially spaced leaf or wall segments 26 diverging outwardly to define a selected included cone angle, here approximately 30°. The interior surfaces of the cone portion 24 and integral wall segments 26 define a concave interior face against which the pressure of the liquid inside the pipe 10 acts, seating the outside of the cone portion 24 against the circumferential bearing surface 18 of the valve seat 14. When the pressure within the pipe 10 is below a selected level (in this specific example about 5 psi), the cone portion 24 has no significant distortion, and a root circumference on the outer side of the cone rests against the circumferential bearing surface at a base circumference region close to but not intercepting the wall segments 26.

The circumferentially spaced wall segments 26 have side edges that define selectively shaped intervening apertures through which water passes. These apertures include a root slot portion 28 diverging outwardly from the base circumference of the wall segments 26 at an angle dependent upon selected flow rate (here approximately 20° for a one to one and one-half quart per hour flow rate). In this example the length of the root slot 28 is approximately 0.020"; this length defining a linear operating region for the emitter, as described in greater detail below. The aperture then widens abruptly at offset shoulders 30 which lie along a circumference about the outer surface of the cone 24, each offset shoulder 30 being approximately 0.015" in length in this example. The aperture then continues as a diverging tip slot 32 whose angle of divergence is approximately 10°, again given by way of example. The outer ends of the wall segments 26 taper outwardly at a terminal flange or lip 34, the curvature of which seats against and mates with the curvature of the flange 16 of the valve seat member 14 when the valve member 20 is fully inserted therein.

A cap member 36 having a peripheral skirt 38 facing toward the outer surface of the pipe 10 includes a concentric inner hub 40. A central hub aperture 42 within the hub 40 receives the free end of the stem portion 22 of the valve member 20, to which it is conveniently affixed by sonic welding although adhesives or threaded couplings may also be used. At the root portion of the hub 40 there is an outward taper 44 which registers within the internal circumference of the valve seat 14, so that the cap member 36 is automatically centered on the valve seat 14 when in engagement. The peripheral skirt 38 of the cap member 36 butts against the outer end of the valve seat 14 to form a seal when internal pipe pressure is terminated or below the operating range. Thus ground water is prevented from flowing back into the line through the emitter.

In the operation of the device of FIGS. 1-4, the depth of penetration of the male cone valve member 20 within the valve seat 14 varies with the pressure within the conduit 10. However, for the selected range of pressures (5-45 psi in this example), the resilient deformation of the cone valve member is such that the root slot 28 between the wall segments 26 is intercepted by the circumferential bearing surface 18 on the valve seat 14. For the given pressure range, the cone portion 24 deforms substantially linearly. The low frictional coefficient of the valve member 20 against the valve seat 14, and the resilient characteristic and stiffness of the cone valve insure stability of position whether pressure is increasing or decreasing. As depicted most clearly in FIGS. 4 and 5, however, the effective flow area and consequently the impedance to flow vary inversely with the extent to deformation of the cone portion 20 in the linear operating region. The effective flow aperture, for each of the four apertures, is defined by the distance between the base of the root slot 28 on one end and the transverse line defined by the circumferential bearing surface 18 on the other, and this length increases as pressure increases. At the same time, however, the angle of divergence of the root slot 28 diminishes, closing down the areas of the multiple apertures, and increasing the impedance to flow so that the flow rate is maintained substantially constant throughout the entire operating range. The line at which the outer surface of the cone valve is tangent to the valve seat shifts only negligibly over the linear operating region.

At the upper pressure end of the operating range, the bearing circumference 18 on the valve seat 14 is proximate the offset shoulder 30 on the cone portion 24. A further increase in pressure of the order of 5-10 psi (to 50-55 psi) axially shifts the offset shoulders 30 past the bearing surface 18 within the interior of the valve seat 14, substantially increasing the area of the effective flow aperture. Under these conditions, the emitter device enters a non-linear flushing or flooding mode in which the flow rate is many times increased. It should be noted that when the non-linear mode is entered, the increased pressure tends to drive the cone valve member 20 to its limit position in which the terminal flanges 34 on the wall segments 26 are seated against the inner flange 16 on the valve seat 14. This effect occurs because the narrower terminal portions of the wall segments 26 are less resistant to bending, and because the bending force is being applied at a greater distance from the base of the wall segments, substantially increasing the bending moment.

The multiple aperture system provided by this type of emitter device is substantially less subject to clogging than presently known devices, which rely either on a single minute aperture or a long restrictive path. While many drip irrigation systems utilize a filter for the irrigation water, impurities are nonetheless present, but these have less effect in emitter devices in accordance with the invention. However, the novel non-linear mode that is entered automatically by simply raising the pressure flushes these impurities from the system. In practice, a brief flushing action may be utilized at regular intervals to help insure uniform flow. In addition, impurities which may tend to collect near the closed ends of long lines may be cleared in conventional fashion by simply opening the ends of the lines. Because of the penetration of the cone valve into the interior of the pipe in a direction normal to water flow, such a cleaning action, if employed, is particularly effective in eliminating particle matter that is caught in the apertures and cannot be removed in the automatic flushing mode.

Emitter devices in accordance with the invention also can be adjusted or their operation corrected very simply by manual means. The external cap member 36 need simply be pushed in toward the pipe 10, for example, if the valve sticks for some reason. Likewise, the cap member 36 can be pulled outwardly to effect a temporary flushing action if such is desired. The pressure range given in the present example is merely illustrative and should not be taken as limiting the application of the devices in any way. A particular advantage of the inventive concept, however, resides in the fact that only the configuration of the slot apertures in the cone valve member need be changed in order to provide a selected operating pressure range. Thus the base circumference of the root slot portions can be altered to vary the lower limit of the linear flow region, or the angle of the root slot can be increased to change the flow rate from quarts per hour to gallons per hour with the same operating pressure range. A combination of these two variations enables widely varying adjustment of the operating range.

Because only three very low cost elements are utilized in providing a pressure compensating emitter which can operate with substantial uniformity across a wide range of pressures, emitter devices in accordance with the invention have significant economic implications for the agricultural industry and for conservation of water resources. With a minimum capital cost, which is dependent primarily on the conduits utilized and only to a lesser extent on the emitter devices, several times the amount of land can be cultivated with a given amount of water. This has profound implications for arid regions, in which water must be supplied by aqueduct or by pumping from underground sources.

Emitter devices in accordance with the invention are also so compact and rugged that they do not interfere with the laying of pipe by automatic machinery, either above ground or under ground. The unobtrusive cap member provides only a small projection from the side of the pipe, and the pipe may accordingly be coiled on a spindle or mandrel with the emitter devices preinstalled, and thereafter fed out automatically to an above ground or under ground installation.

Drip irrigation systems can be subjected to a wide range of temperature and other environmental conditions. While most installations operate substantially continuously under almost static conditions with only periodic flushing, it may be desirable to operate other installations with much shorter cycle times. Under a combination of conditions of high temperature and repeated cycling, some plastic materials can undergo hysteresis or fatigue effects, as evidenced by a tendency to maintain a deformed state temporarily or to develop cracking at points of greatest stress. Rather than use higher cost material, it is expedient to utilize an internal rib structure as depicted in FIGS. 6–8. In these Figures, numerical designations corresponding to those of FIGS. 1–5 are utilized for equivalent parts. However, in FIGS. 6–8, the interior concave portion of the cone member includes a cruciform tapered rib structure 50 centered on the midpoint of the cone portion 20. Each rib 52 extends from this middle region along the midline of a different wall segment 26, tapering in height as seen most clearly in FIGS. 7 and 8 until merging into the surface of the wall segment 26 near the tip thereof.

In cross section, each rib 52 is arranged and functions as a beam segment, distributing the applied bending forces. If necessary for a particular application, the needed deformation in response to a given applied pressure can be achieved by adjustment of the thickness of the cone wall while retaining the rib. The distribution of forces achieved by using a beam segment minimizes the possibility of hysteresis and fatigue effects.

In all of the practical examples of structures in accordance with the invention, the deformable cone valve is configured such that the material is operated against by forces that are well under the elastic limit of the material. With respect to the example of FIGS. 1–5, for example, a Delrin cone valve member 20 of approximately 0.25" total length had leaf segments of 0.08" axial length and wall thickness of approximately 0.011". The root slot had an axial length of 0.020", and the cone valve diameter was 0.285". The structure was stressed very lightly under the given operating conditions. The axial length from inner cone valve end to outer cap element surface was only 0.3", and it can be seen that this element is not only small in size but low in cost.

The arrangement of FIGS. 1–5 is constructed for use with pipe that can be temporarily deformed, or for installation in pipe during the extrusion stage. The arrangement of FIG. 9 depicts the use of flow control devices in accordance with the invention in conjunction with metal or rigid pipe such as polyvinyl chloride. In FIG. 9, a larger aperture is provided in the side of the pipe 10, the aperture in this instance having a female threaded surface. A sleeve member 80 haveing a male thread 82 on its outer periphery is seated in the pipe aperture and is disposed to encompass the valve seat 14 in closely fitted relation. The sleeve 80 may be rigid, in which event the valve seat 14 and the valve 20 are inserted from one side and the cap member 36 is thereafter coupled to the stem 22 from the other side during assembly and prior to insertion of the sleeve 80 in the pipe. The sleeve 80 may be temporarily deformed, in which event the emitter device may be inserted as previously described. Tabs 84 extend outwardly from the outer surface of the sleeve 80, outside the outer circumference of the cap member 36, to permit ready insertion and removal of the sleeve 80 and the emitter device.

Alternatively the outer surface of the sleeve 80 may include slots or depressions (not shown) in which a tool may be received for threading the device in or out. If a detachable structure is not desired, then the sleeve need not be threaded but may simply be attached by a peripheral adhesive or seal.

Although there have been described above and illustrated in the drawings various modifications, variations and improvements in accordance with the invention, it will be appreciated that the invention encompasses all forms and variations falling within the scope of the appended claims.

What is claimed is:

1. A pressure compensating emitter for a drip irrigation system comprising:
    a valve seat member mountable in the wall of an irrigation conduit; and
    a segmented cone valve registering within the valve seat member and including a stem portion extending outside the conduit wall and a cone portion interior to the valve seat member relative to the conduuit, the cone portion having circumferentially separated wall segments distortable inwardly in response to conduit internal pressure to penetrate within the valve seat member, the spaces between the separated wall segments defining apertures that decrease in width with greater penetration.

2. A flow control device for a liquid conduit comprising:
    a female valve seat member disposed in the conduit wall and providing an outlet aperture; and
    a male valve member having a conical portion bearing against said valve seat member, said male valve member being movable relative to the valve seat member and resiliently deformable in response to pressure within the conduit, the conical portion including a plurality of variable apertures which diminish with increasing pressure.

3. The invention as set forth in claim 2 above, wherein said male valve member comprises individual deformable circumferentially spaced wall segments defining the variable apertures therebetween, and a concave pressure receiving surface including the interior faces of said wall segments.

4. An emitter device for providing a substantially constant, relatively low flow rate, outlet flow from a pipe containing liquid at substantial pressure comprising:
    a cylindrical valve seat disposed in an aperture in the pipe wall and including a central aperture and a circumferential interior bearing surface adjacent the pipe wall interior;
    a valve member having a central stem extending through the central aperture in said valve seat and including distortable leaf elements defining a diverging cone intergral with said stem and registering against the bearing surface interior to said pipe, said leaf elements bending inwardly in response to variable pressure within the pipe acting against the interior surface of the diverging cone, and being separated by shaped slots through which liquid may pass, the effective areas of the slots decreasing in accordance with inward shifting of the valve member relative to the pipe; and
    a cap member coupled to the exterior end of said stem.

5. The invention as set forth in claim 4 above, wherein the diverging cone of said valve member includes interior integral ribs extending along said leaf elements.

6. The invention as set forth in claim 5 above, wherein said emitter device further includes a sleeve insert disposed within the aperture in the pipe wall and registering about the cylindrical valve seat in mating relation.

7. The invention as set forth in claim 6 above, wherein said cylindrical valve seat is fixedly coupled to said sleeve insert and said sleeve insert is threadably engaged to said pipe wall.

8. The invention as set forth in claim 4 above, wherein said cap member engages and seals the exterior end of said cylindrical valve seat when said valve member is under low pressure.

9. An emitter device for mounting in a pipe for drip irrigation systems comprising:
a cylindrical valve seat having a central aperture and registrable within a hole in the pipe wall, said valve seat including an outwardly flanged lip at the interior end defining a circumferential bearing surface thereof;
a valve member having a cylindrical stem portion disposed coaxially within the central aperture of the valve seat and extending proximate the pipe exterior, and further including a diverging cone portion at an end interior to the pipe, the cone portion comprising circumferentially spaced leaf members emanating from a root circumference and separated by a substantially triangular diverging root slot adjacent the root circumference, the leaf members having selected stiffness to distort inwardly against the bearing surface under liquid pressure in the pipe and move the valve member radially outwardly relative to the pipe to define apertures of diminishing width but increasing length as the valve member shifts outwardly against the bearing surface, the valve member having a relatively low friction surface and the leaf stiffness and low frictional restraint providing reciprocal movement in response to liquid pressure variations in the pipe; and
a cap member disposed exterior to the pipe and coupled to the end of the cylindrical stem portion of the valve member that extends proximate the pipe exterior.

10. The invention as set forth in claim 9 above, wherein said valve member includes integral rib means extending along said leaf members.

11. The invention as set forth in claim 9 above, wherein said valve seat has a flanged interior lip engaging the inner corner of the pipe and further defining the bearing surface for the valve member, and wherein said valve member comprises a synthetic polymer having a low frictional coefficient and a modulus of elasticity of approximately 400,000 psi.

12. The invention as set forth in claim 11 above, wherein said leaf members of said valve member are configured such that they define a separating triangular notch at the root circumference and a substantially larger width slot therebetween to the free end terminal portions thereof.

13. The invention as set forth in claim 9 above, wherein the valve member stem registers within the central aperture in the valve seat with a selected clearance to define an interior cylindrical aperture within which liquid may pass, and wherein the bases of said slots lie on an exterior circumference of the cone portion of said valve member which is substantially in registry with the interior circumferential bearing surface on said valve seat when the valve member is exposed to liquid pressure within the pipe below a selected operating range.

14. The invention as set forth in claim 13 above, wherein said leaf members are shaped to define a diverging separating slot at the free end terminal portions thereof, and include an outwardly curving terminal lip relative to the cone in which they lie, and wherein said leaf elements have thicknesses and stiffness selected such that the leaf elements distort fully inwardly relative to the cone in which they lie in response to a selected high level pressure, such that the valve member is forced radially outwardly relative to the pipe until the terminal lips thereof engage said valve seat, and the apertures defined by said diverging slots permit a purging flow through said emitter device.

15. The invention as set forth in claim 14 above, wherein said leaf members are configured to define separating apertures therebetween comprising a root edge triangular notch having a diverging angle of approximately 20°, an offset edge, and a terminal diverging slot having a divergence angle of approximately 10° when the valve member is in the unstressed condition; and wherein the valve member comprises four leaf members.

16. The invention as set forth in claim 15 above, wherein said circumferential bearing surface is approximately 0.2" in diameter, wherein said valve member has a modulus of elasticity of approximately 400,000 psi, and wherein said emitter device provides a flow rate of approximately one to one and one-half quarts per hour through a pressure range of approximately 5 to 45 psi.

17. The invention as set forth in claim 13 above, wherein said cap member comprises an interior hub coupled about the free end of the stem portion and mating within the inside of the end of the valve seat that is exterior to the pipe, and a cap surface forming a seal therewith when the valve member is subjected to less than a selected liquid pressure in the pipe.

18. A pressure compensating emitter for a drip irrigation system comprising:
a cylindrical valve seat member mountable in the conduit wall of the irrigation conduit, said valve seat including a curved flange portion at the interior side of the conduit wall engaging said conduit wall, and the inner surface of the curved portion defining a circumferential valve seat surface;
a valve member including a valve stem portion extending coaxially through said valve seat and including an integral diverging valve cone having four circumferentially spaced similar segments defining a cone having an approximately 80° diverging angle, the edges of adjacent segments defining slot apertures therebetween, the slot apertures including a diverging root slot of approximately 20° angle, and approximately 0.020" length, and terminating in an offset shoulder portion having surfaces lying circumferentially relative to the cone, the slot apertures further including edges defining a diverging end slot of approximately 30° angle commencing at the offset shoulder surface, the modulus of elasticity, thickness and width of the circumferential segments being such that a water pressure of from 5 to 50 psi against the interior cone surface forces the cone against the valve seat surface of the valve seat to deform so as to assume a position relative to the valve seat surface dependent upon the interior pressure, the deformation of the cone causing the root slot apertures to tend to converge in response to increased pressure, the convergence providing increased impedance to liquid flow, such that the flow rate remains substantially constant over the 5 to 50 psi pressure range, the valve cone further deforming inwardly to a smaller converging angle in response to water pressures in excess of approximately 60 psi, such that a flushing water flow is created through the enlarged aperture area presented by the diverging end slot portions between the valve cone segments; and a cap member coupled to the free end of the stem portion of the valve member, and including a flanged interior surface and a central hub of smaller diameter than the interior of the valve seat member, the flanged interior surface butting against the exterior end of the valve seat member when the valve member is under less than a selected pressure.

* * * * *